(12) United States Patent
Parthasarathi et al.

(10) Patent No.: US 12,137,339 B2
(45) Date of Patent: Nov. 5, 2024

(54) ULTRA-WIDEBAND COMMUNICATION NODE AND METHOD FOR CONTENTION BASED RANGING

(71) Applicant: NXP B.V., Eindhoven (NL)

(72) Inventors: Srivathsa Masthi Parthasarathi, Bangalore (IN); Stefan Lemsitzer, Stainz (AT)

(73) Assignee: NXP B.V., Eindhoven (NL)

( * ) Notice: Subject to any disclaimer, the term of this patent is extended or adjusted under 35 U.S.C. 154(b) by 314 days.

(21) Appl. No.: 17/649,247

(22) Filed: Jan. 28, 2022

(65) Prior Publication Data

US 2022/0256338 A1    Aug. 11, 2022

(30) Foreign Application Priority Data

Feb. 11, 2021    (IN) .............................. 202111005873

(51) Int. Cl.
*H04L 29/06*    (2006.01)
*H04L 9/08*    (2006.01)
*H04L 9/40*    (2022.01)
*H04W 12/037*    (2021.01)
*H04W 12/0431*    (2021.01)

(52) U.S. Cl.
CPC ......... *H04W 12/037* (2021.01); *H04L 9/0866* (2013.01); *H04L 9/0869* (2013.01); *H04L 63/0869* (2013.01); *H04W 12/0431* (2021.01); *H04L 2209/80* (2013.01)

(58) Field of Classification Search
CPC ............ H04W 12/037; H04W 12/0431; H04L 9/0866; H04L 9/0869; H04L 63/0869
See application file for complete search history.

(56) References Cited

U.S. PATENT DOCUMENTS 4,529,870 A * 7/1985 Chaum ............ G06Q 20/40975
283/73
10,486,646 B2 * 11/2019 Ledvina .................. G01S 13/76
(Continued)

FOREIGN PATENT DOCUMENTS

WO    2020/197221 A1    10/2020

OTHER PUBLICATIONS

Almalkawi, Islam. "Wireless multimedia sensor networks, security and key management." (2013). (Year: 2013).*

(Continued)

*Primary Examiner* — Shawnchoy Rahman

(57) ABSTRACT

Disclosed is a UWB communication node comprising: a UWB communication unit configured to transmit one or more messages, to a plurality of external responder nodes and comprising a ranging control message defining a contention period, and further configured to receive one or more responses from said responder nodes during said contention period, each response including a response payload; a processor unit configured to use a common cryptographic session key to encrypt said messages; wherein the processing unit is further configured to use responder-specific session keys to decrypt the response payloads; wherein each individual one of said responder-specific cryptographic session keys is a unique key shared between the node and one of the external responder nodes. Corresponding systems methods and an associated computer program are also disclosed.

16 Claims, 4 Drawing Sheets

(56) References Cited

U.S. PATENT DOCUMENTS

| | | | | |
|---|---|---|---|---|
| 2003/0070069 A1* | 4/2003 | Belapurkar | ........... | H04L 9/3226 |
| | | | | 726/8 |
| 2003/0204738 A1* | 10/2003 | Morgan | .............. | H04L 63/0853 |
| | | | | 713/194 |
| 2019/0349434 A1* | 11/2019 | Haleem | ............... | H04L 45/7453 |
| 2020/0182996 A1 | 6/2020 | Lee et al. | | |
| 2021/0173064 A1* | 6/2021 | Yoon | .................... | H04B 1/7163 |
| 2021/0360395 A1 | 11/2021 | Lemsitzer et al. | | |

OTHER PUBLICATIONS

Ahmadzadegan, Mohammad Hossein. "Security-centric analysis and performance investigation of IEEE 802.16 WiMAX." (2015). (Year: 2015).*

* cited by examiner

ULTRA-WIDEBAND COMMUNICATION NODE AND METHOD FOR CONTENTION BASED RANGING

CROSS-REFERENCE TO RELATED APPLICATIONS

This application claims priority under 35 U.S.C. § 119 to Indian Patent Application No. 202111005873, filed on Feb. 11, 2021, the contents of which are incorporated by reference herein.

FIELD

The present disclosure relates to an ultra-wideband communication node. Furthermore, the present disclosure relates to a corresponding method of operating an ultra-wideband communication node, ultra-wideband communication system, and to a corresponding computer program.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

SUMMARY

According to a first aspect of the present disclosure there is provided an ultra-wideband, UWB, communication node comprising: a UWB communication unit configured to transmit one or more messages to a plurality of external responder nodes, the one or more messages comprising a ranging control message defining a contention period, and further configured to receive one or more responses from said responder nodes during said contention period, each response including a response payload; a processor unit configured to use a common cryptographic session key to encrypt said messages, wherein said common cryptographer session key is a key shared between the UWB communication node and all the external responder nodes; wherein the processing unit is further configured to use responder-specific session keys to decrypt the response payloads; wherein each individual one of said responder-specific cryptographic session keys is a unique key shared between the ultra-wideband communication node and one of the external responder nodes. The one or more messages generally includes a polling message subsequent to the ranging control message. The UWB communication node may use responder-specific session keys to encrypt further messages to the responder nodes. Thus, according to this aspect of the present disclosure, it may be possible to efficiently provide UWB ranging using contention based ranging with multiple responders.

In one or more embodiments, the processor unit is further configured to generate a random number, and at least one of the common cryptographic session key and each of said responder-specific cryptographic session keys is derived from the random number. Such prior distribution of a random number which is specific to one, or a group of, ranging sessions may enhance the security of the system.

In one or more embodiments the processor unit is further configured to generate a respective medium access code, MAC, address for each of the external responder nodes, and wherein each of said responder-specific cryptographic sessions key is further derived from the respective MAC address. Using the MAC address of an individual device may help to improve the security of the communication In one or more embodiments the communication node further comprises a further communication unit which is configured to transmit an identifier of the communication node. The further communication unit may in particular use on so-called "out-of-band" communication such as BLE or Wi-Fi.

In one or more embodiments, the communication node is operable for a ranging session comprising transmission of said message and receipt of said response, wherein the further communication unit is further configured to transmit the random number and an identifier of the ranging session. In other embodiments, the random number and identifier of the ranging session may be transmitted by the communications unit in the ranging control message broadcast advertisements.

In one or more embodiments, the communication node further comprises further comprising a secure element, wherein the common cryptographic session key and the responder-specific cryptographic session keys are stored in said secure element. A secure element is a particularly convenient way of storing sensitive information. In one or more other embodiments, an electronic secure element may be used as an alternative to a hardware secure element; in yet further embodiments, the sensitive information may be stored in the processing unit. In such embodiments a secure element may not be required.

In one or more embodiments the ultra-wideband communication unit is further configured to receive identifiers from the external responder nodes, wherein said identifiers uniquely identify the external responder nodes, and wherein the processing unit is further configured to use the identifiers to retrieve responder-specific cryptographic session keys from the secure element. Typically, each identifier may be the respective MAC address of the responder node, although other identifies may be used as alternatives thereto. The MAC address or other identifier may be included in a header to the message response received from the respective responder node.

In one or more embodiments, the communication node may further comprise an authentication unit configured to perform a mutual authentication process with the external responder nodes.

The messages and the responses may typically include scrambled timestamp sequences and payloads.

In one or more embodiments, the common cryptographic session key and the responder-specific cryptographic session keys may be usable for a single communication session or for a limited number of communication sessions.

In one or more embodiments, the processing unit is further configured: to generate a new common cryptographic session key and new responder-specific cryptographic session keys after one or more communication sessions have ended; and to share said new common cryptographic session key and new responder-specific cryptographic session keys with the responder nodes, wherein the new common cryptographic session key is shared with all the responder nodes and each new responder-specific cryptographic session key is shared with a specific one of said responder nodes.

According to a further aspect of the present disclosure, there is provided a communication system comprising the communication node as above and the plurality of responder nodes, wherein each one of said responder nodes is configured: to use the common cryptographic session key to decrypt messages received from the communication node; and to use the responder-specific cryptographic session key that has been shared with the respective responder node to encrypt responses to said messages and/or to decrypt further messages received from the communication node.

In one or more embodiments the communication node is configured to carry out ranging operations with the responder nodes, and said ranging operations include one or more of said messages and one or more of said responses.

According to a yet further aspect of the present disclosure, there is provided a method of operating an ultra-wideband communication node, comprising: transmitting, by an ultra-wideband communication unit comprised in the communication node, one or more messages to a plurality of external responder nodes and receiving, by said communication unit, one or more responses from said responder nodes; using, by a processing unit comprised in the communication node, a common cryptographic session key to encrypt said messages, wherein said common cryptographic session key is a key shared between the ultra-wideband communication node and all the external responder nodes; identifying, from each of said one or more responses, the respective responder node from which it was received, and using, by said processing unit, responder-specific cryptographic session keys to decrypt the responses and/or to encrypt further messages to the responder nodes, wherein each individual one of said responder-specific cryptographic session keys is a key shared between the ultra-wideband communication node and one of the external responder nodes.

In one or more embodiments the method may further comprise transmitting, by a further communication unit comprised in the communication node, the common cryptographic session key and the responder-specific cryptographic session keys to the respective external responder nodes.

In one or more embodiments, the method includes identifying, by the processing unit comprised in the communication node, from a header to the response, a one of the plurality of external responder nodes from which each response is received prior to decrypting the respective response.

According to a yet further embodiments aspect of the present disclosure, there is provided a computer program comprising executable instructions which, when executed by a processing unit, cause said processing unit to perform the steps of the methods mentioned above. Thus, there may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
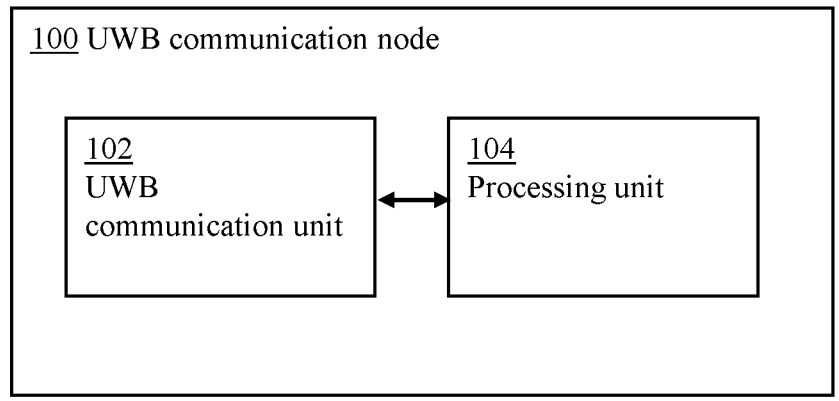
FIG. 1 shows an illustrative embodiment of a UWB communication node.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

UWB technology may also be used for supporting applications which are typically performed by technologies such as near field communication (NFC), for example for supporting the execution of transactions with another communication device (e.g., a payment terminal). Examples of such transactions include payment transactions in a variety of stores, ticket validations or fare payments in the public transportation sector and authorisation of physical access (e.g. into a building). Such a transaction usually comprises an exchange of one or more commands (e.g., instructions) and responses (e.g., data) between two communication devices. In such a scenario, a UWB communication device facilitates the localization of the communication counterparts if a communication technology such as Bluetooth low energy (BLE) or Wi-Fi is used for executing a transaction between the communication counterparts. These communication technologies have a larger range than NFC, and therefore the localization of the communication counterparts becomes important. In particular, when NFC is used for carrying out a transaction, the intent of a user is implicitly given because NFC can only be realized while the communication counterparts are in close proximity of each other. However, the intent of a user may not be clear if a larger-range communication technology is used. For example, a user may be within communication range of a payment terminal, such that a transaction might be initiated between his mobile phone and the terminal, but instead of approaching the terminal, the user leaves the store. In this case, the transaction might be executed while this was not intended.

Thus, the system may not be sufficiently reliable and secure. In such a case, UWB may be used to track the movement of the user, and if this movement implies the intention of the user to carry out the transaction (e.g., if the phone approaches the terminal in the expected manner) then the transaction may be concluded. Thus, an UWB ranging session involving a plurality of ranging operations to track the phone's movements is used as a complementary security feature, to compensate for the loss of security inherently caused by the larger-range technologies.

Thus, a UWB communication device integrated in a mobile phone may perform a sequence of ranging operations with another UWB communication device integrated in a payment terminal or a transit gate, to increase the reliability and security of a transaction (e.g., to verify whether the phone is carried by a user who approaches the terminal or the gate). The transaction, which is executed through an out-of-band communication channel (i.e., not through the UWB communication channel), may involve initial steps such as the identification, authentication and verification of access rights of the phone, and concluding steps such as the completion of the transaction and the confirmation by the terminal that the transaction has been concluded. The UWB ranging session is used to verify whether the phone approaches the terminal, which implies that the user has the intention to carry out the transaction. In typical NFC use cases, this intent is implicitly given by the technology, because the user needs to be in close proximity (10 cm) of the terminal. Using BLE, the transaction is typically initiated while the user is many meters away from the terminal. Therefore, a UWB ranging session is executed to verify whether the user correctly approaches the terminal, and the transaction is concluded in dependence on the result of the UWB ranging session. The transaction is then carried out using the out-of-band communication channel (BLE).

Alternatively, both the ranging operation and the transaction itself may be carried out in-band, i.e. through the UWB communication channel. Thus, the UWB devices may carry out functions which are typically carried out by NFC devices. An example of an application or use case is that of physical access control, for instance through the turnstiles or other access control points of a public mass transport system or a sports venue. One notable feature of such applications or use cases is that there may be expected to be many users and thus many mobile phones—which may also be referred to as responders—which may require to perform ranging activities with the same gate-control—which may also be referred to as initiators. Recently, protocols have been developed across and among the relevant industrial users to allow such multiple ranging activities to occur at the same time. Such protocols fall generally into two types. According to a first group of protocols, which is sometimes referred to as multicast ranging, a controller or initiator device, which would typically be the terminal reader or gate control, controls the sequence of the UWB communication, and allocates a particular time slots to each of the UWB controlees/responders, which would typically be phones. Once the controller has established that the communication pattern, it may send out a broadcast message to all the phones. From the timing of this broadcast message, each phone or controlee/responder can determine when it should transmit its response. Interference between phones can thus be minimised. However it will be appreciated that according to such group of protocols, there needs to be a well-defined set of controlees, each of which has its own time slot. In many applications the number and identities of the controlees which are in the vicinity of the controller may vary, and in particular many devices may be transitory.

A further group of protocols have thus recently been developed to allow for a variable number of phones or controlees/responders. In these protocols, the controller is arranged to transmit a broadcast signal, following which any of the available controlees/responders may transmit a response, in any time slot within a predetermined period. Such protocols are typically referred to as contention based ranging, since it is possible that more than one controller/responder attempts to transmit its response in the same time slot. The protocols resolve the resulting contention between possible responses. Whereas the contention resolution adds to the complexity of such protocols, they are generally much more time efficient than the "one-slot-per-responder" multicast protocols.

The present disclosure is directed at such contention based protocols, and methods, and devices and systems configured to implement them.

A typical UWB ranging session includes one or more messages (i.e., commands) transmitted from a UWB communication node (which is also referred to as a "reader" herein) to one or more external UWB responder nodes (i.e., communication nodes which are external to the communication node), as well as one or more responses to those commands, which are transmitted back to the communication node by the responder nodes. These messages and the responses to these messages should be protected by encryption. For this purpose, cryptographic session keys are used. That is to say, the communication node encrypts the messages using such a session key, and the responder nodes each decrypt the messages using the same or a corresponding session key (depending on whether symmetric or asymmetric cryptography is applied). Similarly, the responder nodes encrypt the responses using the session key, and the communication node decrypts the responses using the same or a corresponding session key. Typically, a single shared cryptographic session key is used, i.e. a key which is shared between the communication node and all the responder nodes. This, however, creates a security risk, because each of the responder nodes that has access to the commonly shared key can impersonate any other responder node that makes use of the commonly shared key.

Now discussed are an ultra-wideband communication node, system and a corresponding method of operating an ultra-wideband communication node, which facilitate increasing the level of security in an ultra-wideband based communication system, in particular by reducing the probability that responder nodes will impersonate each other, and/or reducing the possibility of interference by third parties in the communication.

FIG. 1 shows an illustrative embodiment of a UWB communication node 100. The UWB communication node 100 comprises a UWB communication unit 102 and a processing unit 104. The UWB communication unit 102 is configured to transmit one or more messages to a plurality of external responder nodes and to receive one or more responses from the responder nodes. The processing unit 104 is configured to use a common cryptographic session key to encrypt said messages, wherein said common cryptographic session key is a key shared between the ultra-wideband communication node and all the external responder nodes. Furthermore, the processing unit is configured to use responder-specific cryptographic session keys to decrypt the responses and/or to encrypt further messages to the responder nodes, wherein each individual one of said responder-specific session keys is a key shared between the ultra-wideband communication node and one of the external responder nodes. Thus, each responder node may encrypt its responses using a responder-specific session key, and the processing unit of the communication node may decrypt the responses using the responder-specific session key. Accordingly, since each response node uses a specific session key to encrypt its responses, the risk that other responder nodes can impersonate said responder node is reduced. Nevertheless, the use of a common cryptographic session key for transmitting messages to the responder nodes facilitates achieving an acceptable performance in terms of computing cost. Alternatively or in addition, the responder-specific session key may be used to protect specific messages (i.e., further messages) from the ultra-wideband communication node to the respective responder node. In this way, the risk that other responder nodes can impersonate said responder node is also reduced, while the use of a common cryptographic session key for transmitting the first message or messages to the responder nodes still facilitates achieving an acceptable performance in terms of computing cost. Thus, a responder node may use the responder-specific session key to encrypt its responses and/or to decrypt further messages from the communication node. If the responder node does not use the responder-specific session key to encrypt its responses, it may use the common cryptographic session key for this purpose.

Figure 2:
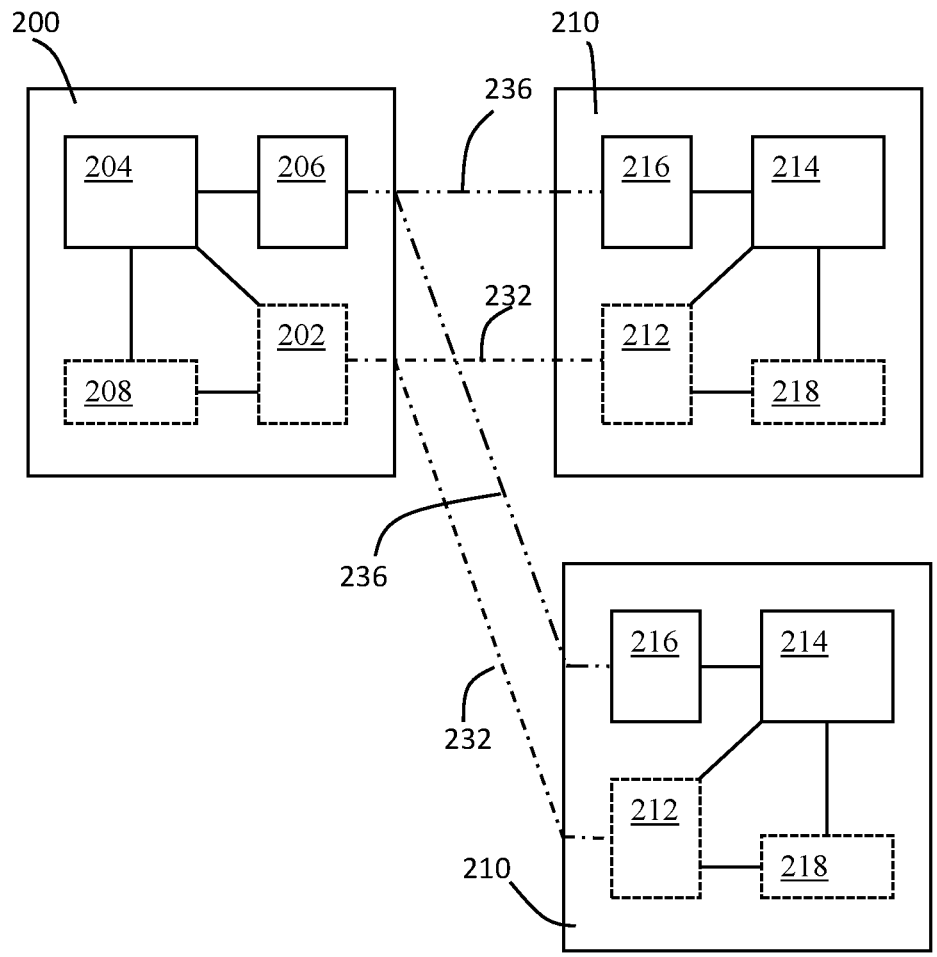
FIG. 2 shows an illustrative embodiment of a UWB communication system.

Turning now to FIG. 2 this shows a communication system comprising a communication node such as that described in FIG. 1. The figure shows a first UWB communication node 200, which comprises a UWB communication unit 202, and a processing unit 204. The UWB communication unit and processing unit may be the same as that shown in FIG. 1 at 102 and 104 respectively. In particular the processing unit may be a host microcontroller unit or similar. The first communication node 200 may further include a further communication unit 206. The further communication unit 206 may be for instance a Bluetooth light energy (BLE) radio or a Wi-Fi radio, and facilitate communications which are "out-of-band" with respect to the UWB communications. Furthermore, according to one or more embodiments the UWB communication node may further comprise a secure element 208. As will be familiar to the skilled person, a secure element is a hardware device or part of a hardware device, which includes hardware-based, or physical, barriers against unauthorised access. Such barriers may include, for example, metal screening layers and/or other features intended to prevent unauthorised access to data stored in the secure. In other embodiments, data may be stored directly in the processing unit 204, the data being protected for instance by encryption or obfuscation. In such embodiments a secure element may not be present.

The first UWB communication node 200 acts as a controller or initiator according to various embodiments of the present disclosure.

In addition to first communication node 200, FIG. 2 shows one or more further UWB communication nodes 210. Each of these respective UWB communication nodes 210 is similar to the communication node 200 and comprises a respective UWB communication unit 212, along with a respective processing unit 214. Furthermore, each further UWB communication node 210 may comprise a respective communication unit 216 and/or a respective secure element 218. The or each of the further UWB communication nodes 210 acts as a controlee or responder according to various embodiments of the present disclosure. The or each further communication nodes 210 may transmit and receive signals respectively to and from the communications node 200 by means of the UWB communication unit 202 and further UWB communication unit or units 212 by communication channel 232. Furthermore, the or each further communication nodes 210 may transmit and/or receive signals to and from the communications node 200 by means of the further communication unit 206 and respective further communication unit or units 216 by communication channel 236.

In one or more embodiments, as will be discussed in more detail hereinbelow, the respective communication unit 212 of each of the controlee or responder UWB communication node 210 may not be required to transmit signals or information, but only to receive information from the controller or initiator UWB communication node 200. Such embodiments may be convenient since a two-way "out-of-band" communication channel or link 236 between the controller and responder may not be required. In such embodiments, it may be sufficient that the controller or initiator transmits information to each of the further communication nodes 210, without requiring a response in that "out-of-band" communication channel: the out-of-band communication channel or link 236 in such embodiments need only be one way. In other embodiments, a two-way link may be provided by the out-of-band communication channel link 236.

Figure 3:
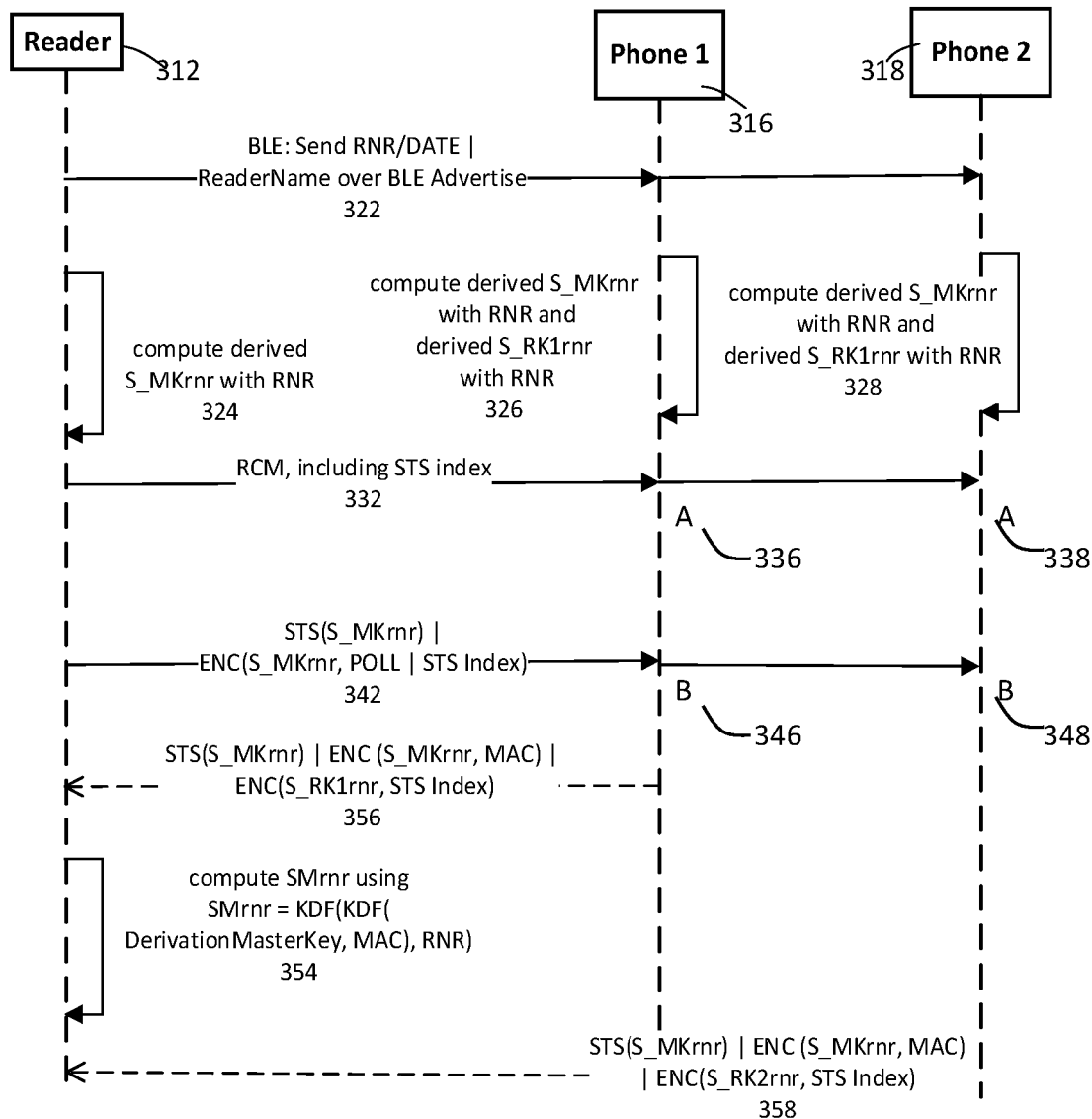
FIG. 3 shows an illustrative embodiment of a method of operating a UWB communication node.

Turning now to FIG. 3, this shows a method of operating a communication node according to one or more embodiments. In this example, the communication node is a reader 312, and the further communication nodes are two phones, being phone1 316 and phone2 318. The reader 312 acts as the controller/initiator; each of the two phones, phone one 316 and phone to 318 acts as controlee/responder. Prior to a contention based ranging session, the reader 312 transmits, via the further communication unit 206, an out-of-band broadcast message or advertisement 322 which contains information to each of the phones. The broadcast message includes an identifier of the reader ("ReaderName"). The broadcast message 322 may further includes a random number, to be used by each of the phones and the reader as described further hereinbelow. The broadcast measured 322 may further contain include an identifier of a ranging session ("Session ID", or "DATE"). This broadcast message may be described as an advertisement or "Advertise". As shown in FIG. 3, the further communication link 236 used, may conform to a BLE protocol. In other embodiments, the further communication link 236 may conform to a Wi-Fi protocol, or other suitable out-of-band protocol. According to the embodiment depicted in FIG. 3, the responders do not require to acknowledge the out-of-band advertisements 322. In other embodiments, the responders may require to acknowledge the out-of-band advertisement 322.

As shown in FIG. 3, according to one or more embodiments, each of the reader 312 and phones 316 and 318 use the content of the out-of-band broadcast message 322 to derive session keys: in the case of the reader 312, the processing unit 204 computes a derived master session key (S_MKrnr) based on the random number. Each of the phone 316 and 318 similarly compute, in their respective further processing unit 214, derived master session key (S_MKrnr) based on the random number. Furthermore, each of the phones computes a responder-specific cryptographic session key: in the case of phone1 316, the phone computes, in its further processing unit 214, a derived responder-specific cryptographic session key (S_RK1rrnr) based on the random number, and its own unique identifier (MAC address). Similarly, in the case of phone2 318, the phone computes, in its further processing unit 214, a derived responder-specific cryptographic session key (S_RK2rrnr) based on the random number, and its own unique identifier (MAC address).

At this point it should be noted that the unique identifier of each of the phones is already known to the reader at this stage of the process. In one or more embodiments, this is achieved by registering each phone with the reader in a provisioning step. During the registration process, the reader may assign the unique identifier or MAC address to each phone. Taking, as the first concrete example, embodiments for providing access to a mass transit system, this registration process may be undertaken when a particular user or subscriber registers, along with their phone, as a potential user of the mass transit system; a central server may store the details and in particular the unique identifier of the phone with each of the stations on the mass transit system, and share this information with the readers in each of the gates, such that the readers in each of the gates are aware of the MAC address of each registered phone. Taking a further concrete example, embodiments for providing access to a building or apartment, the registration process may involve assigning the user, along with their phone, as an authorised occupant or entrant to the building or apartment.

Returning to the method shown in FIG. 3, a ranging session commences with the transmission, by the reader 312 of a ranging control message (RCM) 332. The ranging control message 332 includes a scrambled timestamp (STS) index. STS index identifies the session. This, and the subsequent messages and responses, are transmitted and/or received by the respective device's UWB communication unit 202, 212. The ranging control message is intended for all phones 316, 318 within the vicinity of the reader. The structure and encryption of the ranging control message and subsequent messages and responses will be described in more detail hereinbelow with respect to FIG. 4.

Once phone1 316 receives the range control message 332, shown at moment A 336 in FIG. 3, it can use the master cryptographic session key (S_MK), to decrypt the payload and header IE of the RCM. Furthermore, phone2 318 receives the range control message 332 at the same moment A indicated at 338 in its timeline of FIG. 3, it can also use the master cryptographic session key (S_MK) to decrypt the payload and header IE of the RCM.

Subsequent to the ranging control message, the reader 312 transmits a poll message 342. Poll message 342 includes a scrambled timestamp STS, which is scrambled according to the session master key S_MKrnr. Poll message 342 further includes encrypted data (indicated in FIG. 3 as "ENC", including the session identifies STS_Index). The poll message 342 is intended for all phones 316, 318 within the vicinity of the reader. The RCM message 332 defines therein a so-called contention period (CP). The timing and duration of the contention period CP may be protocol-specific, but generally follows immediately from the poll message 342. Generally, the poll message will conform to the SP1 or SP2 format according to the IEEE802.15.4 standard; according to SP1, the format is SFD and SYNC, followed by STS and Payload in that order; in SP2, the format is SFD and SYNC followed by Payload and STS in that (opposite) order.

Once phone1 316 receives the poll message 342, shown at moment B 346 in FIG. 3, it can use the Session ID (given by STS_INDEX) value, to decrypt the STS of the poll message. Furthermore, phone2 318 receives the poll message 342 at the same moment B indicated at 348 in its timeline of FIG. 3, and it also can use the Session ID and STS_INDEX value, to decrypt the STS of the poll message.

Each of the phone 316, 318 may then send a response to the reader 312, during the contention period CP. Note that, in contrast to multicast ranging, there is no predetermined order of precedence of the responses. Each phone is free to determine, on a random basis, which slot to use within the contention period. Shown in FIG. 3 is an example in which phone1 316 sends a response 356 early in the contention period. The response includes a scrambled timestamp STS, wherein the scrambling is based on the session master key S_MK rnr followed by data, which is encoded as indicated in FIG. 3 by "ENC". The encoded data includes two parts, as will be described in more detail hereinbelow. The first part is encoded according to the session master key S_MKrnr; the second part which includes a timestamp of the response is encoded using the response-specific session key S_RK1rnr.

On receipt of the response, it can be decoded into parts by the reader. In particular the reader requires to know from which phone 316, 318 the message is sent, in order to determine the appropriate responder-specific cryptographic session key to used to decode the payload. However at the start of the receipt this is unknown to the reader. The reader therefore decodes the header which was encoded using the master session key, using the master session key, to determine the unique identifier (MAC address) of the phone.

In passing it should be noted that this complexity—that is to say, having to first decode a first part of the message in order to determine from which responder it was received, prior to decoding the remainder of the message using the responder specific key—does not arise in the case of multicast ranging in which individual time slots are allocated to individual responders. In that scenario, the reader knows in advance from which responder to expect a response in any given time slot. The reader then can directly decrypt the payload of the response using the appropriate responder-specific cryptographic session key. Nonetheless, contention based ranging as disclosed herein will often be the preferred method, due to the significant time-saving potentially achieved thereby.

Figure 4:
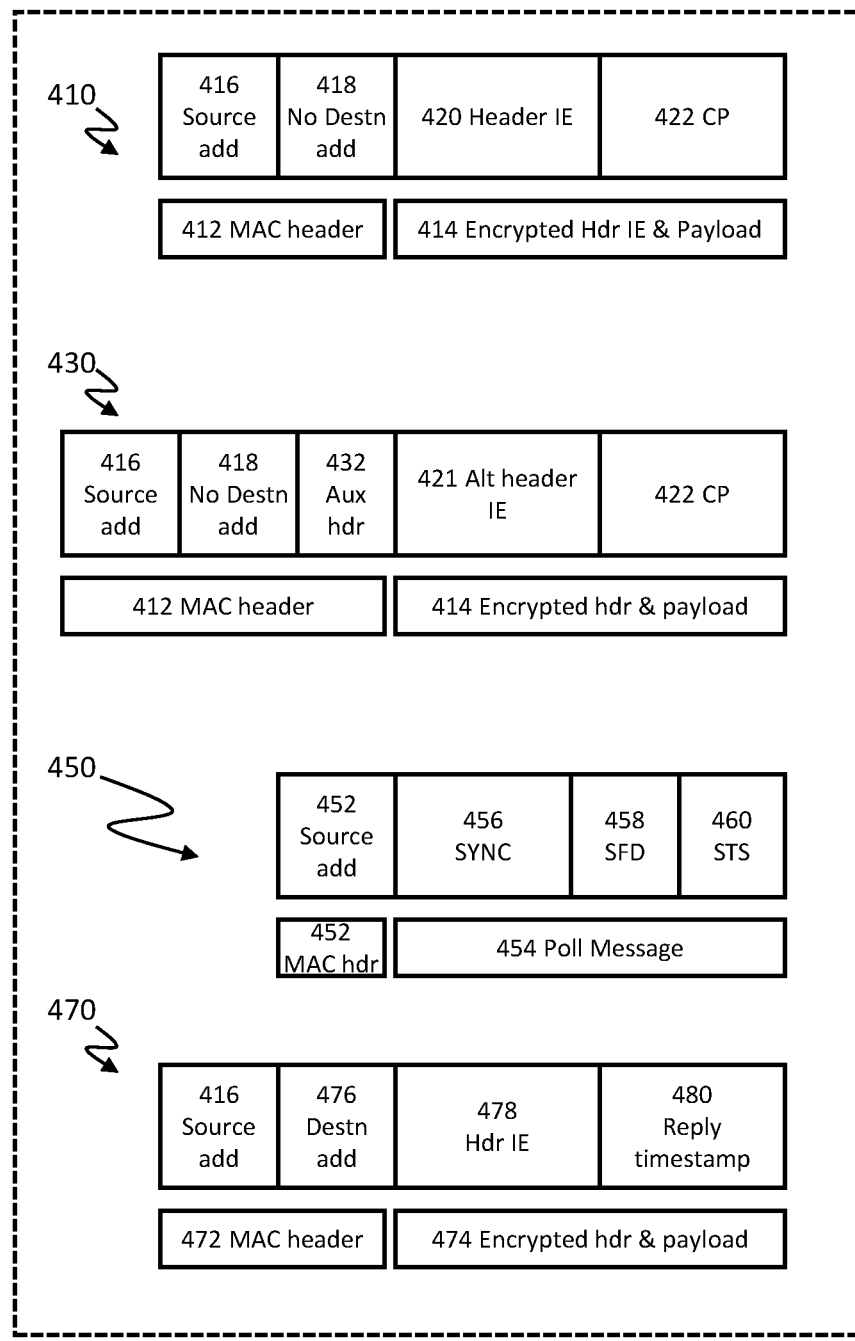
FIG. 4 shows the structure of various packets associated with UWB ranging methods.

Turning to FIG. 4, this figure shows the structure of various of the messages and responses mentioned above and applicable to embodiments of the present disclosure. The figure shows a first ranging control message structure 410, illustrating the structure of a range control message according to one or more embodiments. The range control message typically complies with the IEEE 802.15 standard. At the access layer level, the message consists of a MAC header part and an encrypted header Information element (IE) and payload part. Looking in more detail, the MAC header part 412 comprises a source MAC address 416 of length eight octets (that is to say, eight 8-bit bytes), and a null or "missing" part 418 which is an indicator that a destination address is not present. This part 418 is shown as null in the present example, since the range control message broadcast is not targeted at any specific device so there is no specific destination MAC address. As the skilled person will be aware, in general, the control message will indicate, within a section "Destination PAN ID", the absence of a destination address: the poll message then does not have an empty or null section, and this results in a shorter message The encrypted header IE and payload part 414 similarly falls into two distinct parts: a first part 420 provides the header IE, which may include a vendor organisationally unique identifier (OUI), a session identifier such as "Session ID" or "DATE", and the "STS Index"; a second part 422, that is to say the payload, defines the timing and duration of the contention period CP.

An alternative structure of the ranging control message, according to one or more other embodiments, is shown at 430. The overall structure is similar to that above in that the message has two parts, comprising a MAC header 412 and an encrypted header IE and payload 414. Once again, the MAC header 412 comprises a source MAC address part 416 and a null part 418 which is an indicator that a destination address is not present. However in this RCM message 430, the MAC header is longer, and includes an auxiliary header 432. The auxiliary header 432 consists of one or both of the random number and the Session ID. A ranging control message of this structure is particularly suited to embodiments in which there has not been previous communication or broadcast by the reader, of the random number used to generate session keys. As ready mentioned above, in one or more embodiments this random number and or the session ID is provided to the phones 316, 318 by out-of-band communication such as BLE or Wi-Fi. In such embodiments the previously mentioned ranging control message 410 is applicable. In the alternative ranging control message 430, the second part being the encrypted header IE and payload is similar to that for the range control message 410, in that it comprises an encrypted header IE 421 and a contention period definition 422. The auxiliary header is similar to the header in the ranging control message 410 except that, in the event that the session ID is included in the MAC header, it is not necessary to include it in the encrypted header IE. A benefit of the alternative ranging control message structure 430 is that the random number, and session ID, are available in a MAC header and thus are not fully encrypted. These pieces of information may thus be readily available to be used by the processor of the phone to derive the master session key in order to decode the encrypted payload data to identify the STS index and contention period CP.

Shown at 450 is the structure of a poll message, sent by the controller/initiator as a broadcast message. The structure comprises source address header of length eight octets, followed by a packet which conforms to the IEEE 802.15.4 standard as an SP3 packet (that is to say a packet which conforms to STS configuration 3). The SP3 packet comprises thus comprises synchronisation bits (SYNC) 456, start of frame delimiter (SFD) 458, and scrambled timestamp (STS) 460. The session master key S_MKrnr is used to scramble the timestamp to provide STS in the poll message Finally, the FIG. 4 shows the message structure of a response 470 sent from one of the phones and received by the reader. The response consists of a MAC header part 472 and an encrypted header Information element ("IE") and payload part 474. Looking in more detail, the MAC header part 412 comprises an 8 octet source MAC address 416), and an 8 octet destination MAC address 476 (which is the same as the source MAC address of the reader). The encrypted header IE and payload part 474 similarly falls into two distinct parts: a first part 478 provides the header IE, which may include a vendor organisationally unique identifier (OUI), and a session identifier such as "Session ID", "STS Index", or "DATE"; a second part 480, that is to say the payload, is a timestamp (STS) of the response or reply.

Figure 5:
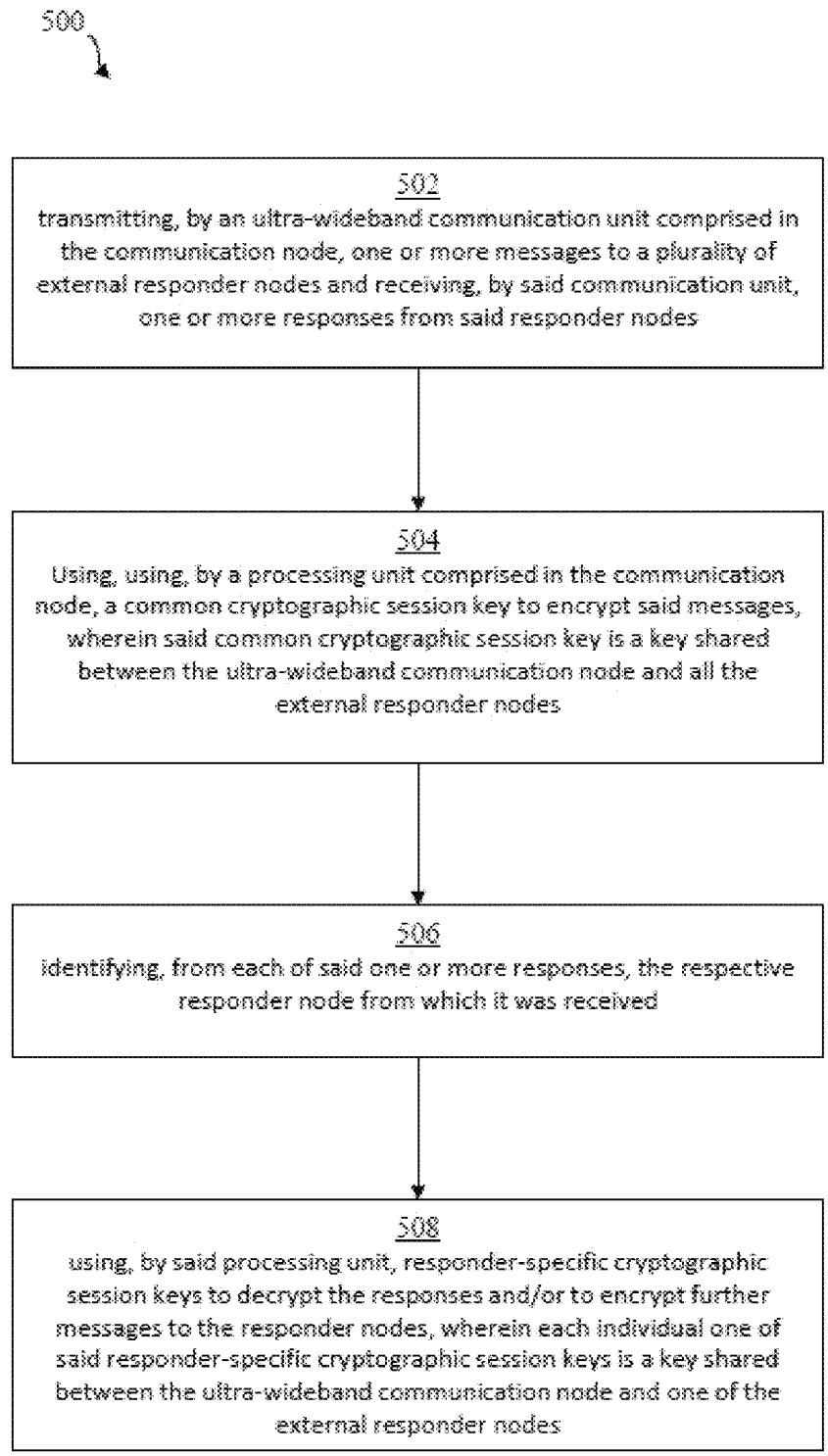
FIG. 5 illustrates a method of operating an ultra-wideband communication node.

FIG. 5 illustrates a method of operating an ultra-wideband communication node. The method comprises, at step 502, transmitting, by an ultra-wideband communication unit comprised in the communication node, one or more messages to a plurality of external responder nodes and receiving, by said communication unit, one or more responses from said responder nodes.

The method continues, at step 504 by using, by a processing unit comprised in the communication node, a common cryptographic session key to encrypt said messages, wherein said common cryptographic session key is a key shared between the ultra-wideband communication node and all the external responder nodes. The method further continues, at step 506, identifying, from each of said one or more responses, the respective responder node from which it was received. The method then continues, at step 508, using, by said processing unit, responder-specific cryptographic session keys to decrypt the responses and/or to encrypt further messages to the responder nodes, wherein each individual one of said responder-specific cryptographic session keys is a key shared between the ultra-wideband communication node and one of the external responder nodes.

From the above descriptions of the message content, it will be appreciated that the ranging control method payload part is encrypted using the master cryptographic session key, and the payload part of the response from each phone is encrypted using the response-specific cryptographic session key (that is to say, the key is specific to one or more messages from that phone).

From reading the present disclosure, other variations and modifications will be apparent to the skilled person. Such variations and modifications may involve equivalent and other features which are already known in the art of UWB ranging, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF REFERENCE SIGNS

100 UWB communication node
102 UWB communication unit
104 processing unit
200 first UWB communication node
202 first UWB communication unit
204 processing unit
206 further communication unit
208 secure element
210 further UWB communication node
212 UWB communication unit
214 processing unit
216 further communication unit
208 secure element
232 UW be communication channel 234 BLE or Wi-Fi communication channel
312 reader
316 phone1
318 phone2
322 out of band broadcast message or advertisement
324 compute master session key
326 compute derived master session key and responder1 session key
328 compute derived master session key and responder2 session key
332 Ranging control message
342 Poll message
354 decryption of a response message
356 ranging response message
410 ranging control message structure
412 MAC header
414 encrypted header i.e. and payload
416 Source MAC address
418 Destination address not present indicator
420 Header IE
421 Alternative header IE
422 Contention period, CP, definition
430 Alternative ranging control message structure
432 Auxiliary header
450 Poll message structure
452 Poll source address
454 Poll SP3 packet
456 start of frame the limiter, SFD
458 synchronisation bits, SYNC
460 scrambled timestamp, STS
470 response message structure
472 response MAC header
474 response encrypted header IE and payload
476 response destination MAC address
478 header IE
480 reply timestamp

The invention claimed is:

1. An ultra-wideband, UWB, communication node comprising:
a UWB communication unit configured to
transmit one or more messages to a plurality of external responder nodes, wherein the one or more messages include a definition of a contention period, and the plurality of external responder nodes includes a first external responder node and a second external responder node,
receive a first response from the first external responder node during a first time slot within the contention period, wherein the first response includes a first encrypted response header and a first encrypted response payload, and
receive a second response from the second external responder node during a second time slot of within the contention period, wherein the second encrypted response includes a second response header and a second encrypted response payload; and
a processing unit coupled to the UWB communication unit, wherein the processing unit is configured to
decrypt the first encrypted response header using a common cryptographic session key to determine a first unique identifier that identifies the first external responder node,
determine, based on the first unique identifier, a first responder-specific cryptographic session key that is a first unique key known by the UWB communication node and the first external responder node,
decrypt the first encrypted response payload using the first responder-specific cryptographic session key to determine a timestamp of the first response,
decrypt the second encrypted response header using the common cryptographic session key to determine a second unique identifier that identifies the second external responder node, wherein the second unique identifier is different from the first unique identifier,
determine, based on the second unique identifier, a second responder-specific cryptographic session key that is a second unique key known by the UWB communication node and the second external responder node, wherein the second unique key is different from the first unique key, and
decrypt the second encrypted response payload using the second responder-specific cryptographic session key to determine a timestamp of the second response.

2. The communication node of claim 1, wherein the processing unit is further configured to:
generate a random number; and
derive the common cryptographic session key and each of the first and second responder-specific cryptographic session keys from the random number.

3. The communication node of claim 2, wherein the processing unit is further configured to:
generate the first and second unique identifiers as first and second medium access code, MAC, addresses for the first and second external responder nodes, and wherein the first responder-specific cryptographic session key is further derived from the first MAC address, and the second responder-specific cryptographic session key is further derived from the second MAC address.

4. The communication node of claim 2 further comprising:
a further communication unit which is configured to transmit an identifier of the communication node and the random number.

5. The communication node of claim 4, wherein the further communication unit is a one of a Bluetooth communication unit, a Wi-Fi communication unit and a cellular communication unit.

6. The communication node of claim 1, further comprising a secure element, wherein the first and second responder-specific cryptographic session keys are stored in said secure element.

7. The communication node of claim 6, wherein the UWB communication unit is further configured to use the first and second unique identifiers received from the first and second external responder nodes to retrieve the first and second responder-specific cryptographic session keys from the secure element.

8. The communication node of claim 1, further comprising an authentication unit configured to perform a mutual authentication process with the external responder nodes.

9. The communication node of claim 1, wherein the one or more messages transmitted by the UWB communication unit include a scrambled timestamp.

10. The communication node of claim 1, wherein the UWB communication node is further configured:
to generate a random number;
to derive the common cryptographic session key from the random number; and
to send the random number to the first and second external responder nodes to enable the first and second external responder nodes to derive the common cryptographic session key.

11. The communication node of claim 10, wherein the processing unit is further configured:
- to generate a new common cryptographic session key, a new first responder-specific cryptographic session key, and a new second responder-specific cryptographic session key after one or more communication sessions have ended;
- to share the new common cryptographic session key with the first and second external responder nodes;
- to share the new first responder-specific cryptographic session key with the first external responder node; and
- to share the new second responder-specific cryptographic session key with the second external responder node.

12. The communication system of claim 1, wherein the communication node is configured to carry out ranging operations with the first and second external responder nodes, and wherein said ranging operations include the one or more messages and the first and second responses.

13. The communication node of claim 10, wherein the common cryptographic session key and the first and second responder-specific cryptographic session keys are usable for a single communication session or for a limited number of communication sessions.

14. The communication node of claim 10, wherein the UWB communication node is further configured:
- to send the first unique identifier to the first external responder node to enable the first external responder node to derive the first unique key; and
- to send the second unique identifier to the second external responder node to enable the second external responder node to derive the second unique key.

15. A method of operating an ultra-wideband communication node, comprising:
- transmitting one or more messages to a plurality of external responder nodes, wherein the one or more messages include a definition of a contention period that includes multiple time slots, and the plurality of external responder nodes includes a first external responder node and a second external responder node;
- receiving a first response from the first external responder node during a first time slot of the multiple time slots, wherein the first response includes a first encrypted response header and a first encrypted response payload;
- receiving a second response from the second external responder node during a second time slot of the multiple time slots, wherein the second response includes a second encrypted response header and a second encrypted response payload;
- decrypting the first encrypted response header using a common cryptographic session key to determine a first unique identifier that identifies the first external responder node,
- determining, based on the first unique identifier, a first responder-specific cryptographic session key that is a first unique key known by the UWB communication node and the first external responder node;
- decrypting the first encrypted response payload using the first responder-specific cryptographic session key;
- decrypting the second encrypted response header using the common cryptographic session key to determine a second unique identifier that identifies the second external responder node, wherein the second unique identifier is different from the first unique identifier;
- determining, based on the second unique identifier, a second responder-specific cryptographic session key that is a second unique key known by the UWB communication node and the second external responder node, wherein the second unique key is different from the first unique key; and
- decrypting the second encrypted response payload using the second responder-specific cryptographic session key.

16. The method of claim 15, wherein:
the first response header and the second response header are encrypted, and
the method further includes
- determining the first unique identifier by decrypting the first response header using a common cryptographic session key; and
- determining the second unique identifier by decrypting the second response header using the common cryptographic session key.

* * * * *